May 16, 1933.  F. J. MATCHETTE  1,909,622
PROCESS FOR THE PROPAGATION OF CULTURE GERMS FOR THE INOCULATION
OF NITROGEN GATHERING PLANTS, SUCH AS LEGUMES
Original Filed Jan. 2, 1923   2 Sheets-Sheet 1

Inventor,
Frank J. Matchette
By Brown, Boettcher & Dienner
Attys.

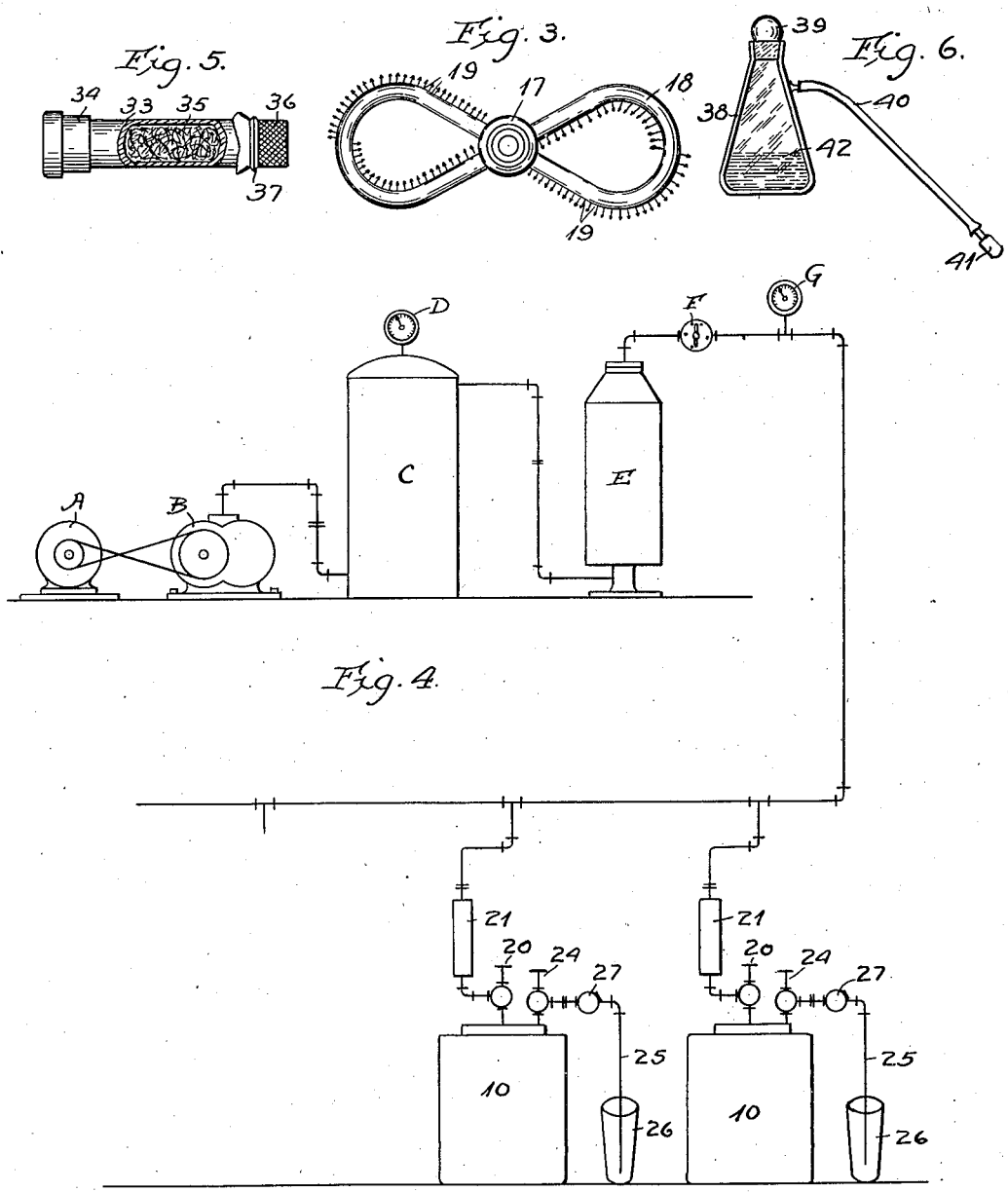

Patented May 16, 1933

1,909,622

UNITED STATES PATENT OFFICE

FRANK J. MATCHETTE, OF NEW YORK, N. Y.

PROCESS FOR THE PROPAGATION OF CULTURE GERMS FOR THE INOCULATION OF NITROGEN GATHERING PLANTS, SUCH AS LEGUMES

Original application filed January 2, 1923, Serial No. 610,404. Divided and this application filed January 17, 1927. Serial No. 161,630.

My invention relates to the propagation of culture germs and the object is to provide a simple and efficient process for the propagation of culture germs for the inoculation of nitrogen gathering plants such as legumes.

This application is a divisional application arising out of my original application Serial No. 610,404 filed January 2, 1923, which has matured into Patent Number 1,618,461, dated February 22, 1927.

To properly point out the relation of the invention to the prior art, it should be stated that legumes such as beans, peas, alfalfa, etc., have the faculty of gathering nitrogen from the air and fixing and storing this valuable plant food element in nodules which form on their roots. The plants can only do this if inoculated with bacteria of the proper strain for the respective plant, as each plant requires a certain kind of bacteria. This bacteria is very rarely present in the soil and must therefore be introduced by artificial inoculation. Further, these plants do not thrive well unless inoculated, and many crop failures are directly traceable to the absence of these bacteria.

The nitrogenous compounds formed remain in the soil with the roots of the plant after the crop is harvested and materially contribute to the fertility of the soil in subsequent raising of other crops. In fact, nitrogen-fixing plants are often grown primarily for the purpose of enriching the soil for future use.

One process of artificial inoculation consists in diluting the bacteria carrying medium with clean water and moistening the seed with this solution just before planting. The bacteria then attach themselves to the roots of the young plant and make their permanent home in the nodules which they form on the roots.

The ordinary laboratory process of propagating these nitrogen gathering bacteria consists of providing a food medium on which the germs can live. This medium is put in test tubes, nursing flasks, or other suitable glass vessels. These bacteria are aerobic in nature and can only live and thrive while in contact with air free of contaminating organisms. For this reason the food medium must be arranged to provide as large a surface as possible and this is usually accomplished by keeping the containers in an inclined position. The food medium is then inoculated with the so-called mother culture and the propagation begins.

It must be emphasized that during the period of preparation, inoculation and propagation, the containers and the food medium must be maintained in an absolutely aseptic condition at all times to avoid contamination of the culture by foreign organisms. It will be understood that every test tube or other container must be handled in a like careful manner, and each one must be filled, sterilized, inoculated and tested frequently to determine the proper concentration of bacteria on a given area of food medium.

My invention is directed particularly toward breeding these legume bacteria on a commercial scale and to eliminate the cumbersome and tedious methods practical only for limited laboratory production.

As above stated, my invention has to do with the propagation of nitrogen-fixing bacteria for use in inoculating legumes. These bacteria are aerobic nitrogen fixing bacteria belonging to the genus Rhizobium, and it is to the propagation of these bacteria that my process is particularly directed.

The accompanying drawings show one form of apparatus and arrangement by means of which the improved method may be practiced. On these drawings, Figure 1 shows the apparatus in elevation, partly sectioned away to show interior parts and their arrangement;

Fig. 3 is a detail view of the air-distributing spider;

Fig. 4 is a diagram showing the arrangement of a battery of the apparatus;

Fig. 5 shows an air-filter which is employed during the process;

Fig. 6 shows a filtering flask employed during the process of inoculation of the food medium with the mother culture.

Figure 1:
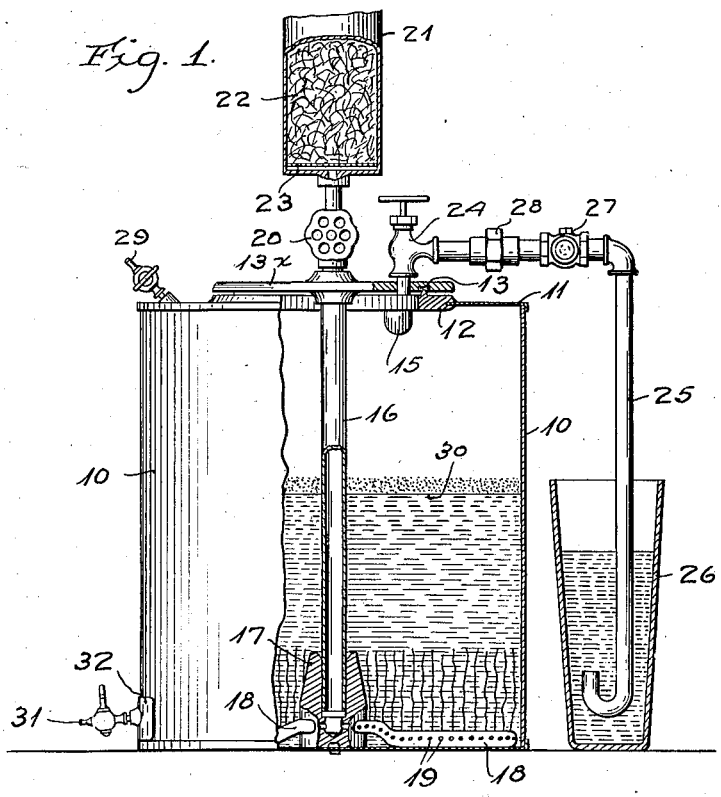
Figure 2:
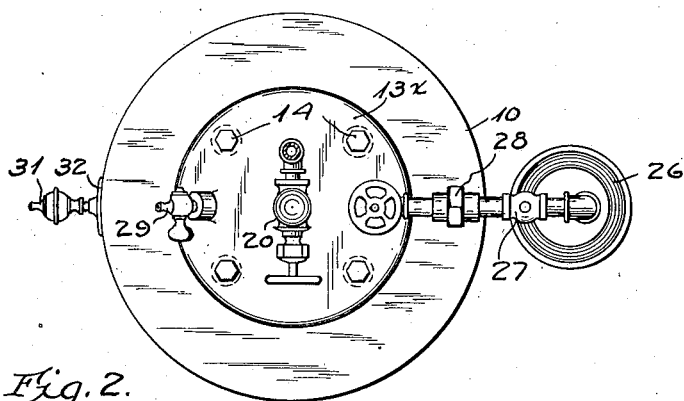
Fig. 2 is a plan view thereof.

Referring now more particularly to Figs. 1 and 2, the apparatus consists of tank 10 having a cover 11. This cover is provided with a ring 12 forming an opening in the center large enough for convenient cleaning and also for the insertion and removal of the air distributing spider 18. On this ring is a suitable ridge 13 which forms an airtight packing when the cover 13X is screwed down into position by means of the cap screws 14.

A pipe 16 is carried by the cover 13X. This pipe slidably fits into a suitable socket in the spider body 17 carrying suitable pipes 18 which may be arranged in a variety of shapes, small air openings 19 being provided on the sides of the pipes. It will be noted that all airholes point in the same rotational direction; this will cause a slight rotational movement of the entire body of liquid in the tank, and thus a more uniform aeration.

A suitable valve 20 is provided for regulating the entrance of compressed air. This compressed air passes through filter 21, which consists of an outer casing, and a cotton filler 22, held in place by suitable screen means 23.

For regulating the discharge of air from the tank a needle valve 24 is provided which delivers air through pipe 25 dipping into a glass vessel 26 partially filled with water to provide a seal. As a further safeguard against un-filtered air being admitted into the tank through the pipe 25, a check valve is provided at 27 which closes as soon as the discharge of compressed air from the tank ceases. A union 28 permits speedy detachment of pipe 25 and check valve 27 when the tank is being prepared for sterilization.

On the tank cover 13X is also provided a pet cock 29 which is used when the liquid or food medium 30 is being inoculated with the mother culture. For this purpose the filter flask 38 shown in Fig. 6 is employed. A cotton stopper 39 filters the air drawn in while the liquid 42 is poured through the tubing 40 and pet cock 29 into the tank. A suitable stopper 41 is provided for the end of the tubing 40. For convenient testing of the contents of the tank, principally for observing the concentration of bacteria, a petcock 31 is provided at the bottom of the tank.

When the tank is being prepared for sterilization, the union 28 is disconnected and the checkvalve 27 and the pipe 25 removed. In its place is put the filter shown in Fig. 5. This filter consists of half of a union 34 into which is soldered a piece of brass tubing 33. The inside of the tubing is filled with cotton 35 and the open end is covered with cloth which may be held in place by means of a cord tied around the groove 37 in the tubing 33.

The tanks are first filled with a certain quantity of the food medium, generally about half full. The air distributing spider Fig. 3, has previously been inserted and is centered on the bottom of the tank by a small conical knob and suitable recess. Next the cover 13X is put in place and screwed down air tight. The filter 21 is not attached to the valve 20 at this time. The valve 20 is then closed and the valve 24 opened. Both petcocks 29 and 31 of course are also in closed position. Then air filter 33 is attached by means of the union 28. It will be noted that now all openings are closed air tight with the exception of the needle valve 24. This valve must be left open to permit expansion and contraction of the air within the tank during the sterilization, and the cotton filter while permitting air to pass through it, keeps out all foreign organisms. The tanks are then sterilized together with the food medium in accordance with ordinary laboratory practice.

The food medium used may be any known or preferred medium suitable for the purpose. Preferably, I employ a medium prepared in accordance with the following formula:—

| | | |
|---|---|---|
| Sucrose | 150 | grms. |
| $KH_2PO_4$ | 7.5 | grms. |
| $MgSO_4$ | 3.0 | grms. |
| $NaCl$ | 3.0 | grms. |
| $CaSO_4.2H_2O$ | .75 | grms. |
| $Ca(NO_3)_2$ | .325 | grms. |
| Yeast water ext | 150 | cc. |
| Water | 4 | gal. |

I do not, however, in any way limit myself to this particular medium, since other suitable food media may be used, and the medium used may be changed within limits.

While other food mediums may be employed in accordance with the broader aspects of my invention, I preferably employ a liquid food medium prepared in accordance with the above formula. This food medium contains a slight amount of nitrogen as well as being slightly acid. The nitrogen content is sufficient to stimulate growth of the bacteria, but is insufficient to hinder maximum development thereof. The slight acidity of the medium is advantageous as promoting propagation of the bacteria.

After the sterilization the tanks are either allowed to cool or are forcefully cooled by immersing in water or otherwise. They are now ready for the inoculation. The filter flask has previously been prepared by introducing into it aseptically a liquid suspension of the mother culture or bacteria. Tubing 40 is connected with the petcock 29 and the mother bacteria poured into the tank. The petcock must be now closed before the tubing is again disconnected, to avoid any unfiltered air getting into the tank.

The tanks are now ready for connection to the air supply. Needle valve 24 is closed, the filter 21 is attached to the globe valve 20, the small air filter 33 removed and the check valve 27 and the air seal pipe 25 put in its place.

Referring to Fig. 4, a suitable source of power A, such as an electric motor, drives an air compressor B which discharges into an air storage tank C, provided with a high pressure gauge D. From the storage tank C the compressed air is piped to a large cotton filter E, the air being forced through the entire length of the filter drum which is tightly filled with sterilized cotton. The air is then conducted to a reducing valve F by means of which the pressure may be cut down to a few pounds above atmospheric pressure. Another pressure gauge G shows the low pressure. The air is then piped through manifold connections for a battery of tanks directly to the upper end of the small air-filters 21 which are attached to the globe valves 20.

After connecting a tank, the globe valve 20 is opened wide and the tank put under pressure and tested for leaks. Next the needle valve 24 is slowly opened and the flow of air through the tank is regulated principally by means of this valve. This serves to maintain a pressure in the tank, which is advantageous in that the bacteria propagate and grow much more readily under air pressures somewhat above atmospheric pressure, than at atmospheric pressure. The air pressure within the tank will depend upon the height of the water column above the outlet end of the pipe 25, and may vary within appreciable limits. Ordinarily this pressure is approximately .433 lbs. per square inch. An added advantage of maintaining the pressure within the tank above atmospheric pressure is that entry of atmospheric air into the tank, with possible resulting contamination of the contents thereof, is prevented in event of a leak developing in the tank above the food medium. Preferably, the temperature within the tank is maintained at approximately 90° F. However, the temperature may be varied within limits, and by using a temperature somewhat below 90° F. the growing period may be prolonged in order to obtain a desired density of bacteria or bacteria count. The temperature will depend largely upon the desired results, and may vary considerably so long as it is within the proper range for propagation of the bacteria. I find, that under ordinary conditions, 90° F. is a desirable temperature and one which facilitates rapid propagation of the bacteria.

The food medium soon becomes permeated with one great mass of bubbles which the many tiny airholes create, and the entire mass of liquid rotates slowly. Every portion of the food medium is thus thoroughly aerated at all times. The use of a liquid medium is of advantage for two reasons—the bacteria can subdivide much more readily in a liquid medium than in one that is not liquid, which greatly facilitates propagation, and the liquid can be aerated and gently agitated with facility so that the entire mass of the liquid medium is effectively aerated and propagation can proceed rapidly throughout such mass in its entirety. The propagation of the bacteria in this fashion is continued for about 6 days, when the desired concentration is generally reached. Progress may be conveniently tested by drawing a few drops of the food medium through the bottom petcock 31 and placing it under the microscope.

Should the supply of compressed air be interrupted accidentally, then the check valve 27 automatically closes and the water seal 26 prevents any possibility of air entering through the needle valve 24. The water seal is also very convenient for adjusting the needle valve 24 by observing the flow of air in the form of bubbles.

When the desired concentration of the bacteria is reached, the air supply to the tanks in question is disconnected and the bacteria are now ready for distribution either in the liquid form as coming from the tank, or in the form of jelly which may be transported in small bottles, or preferably in a granular medium. By granular medium is meant a suitable rich soil of characteristics best suited for temporary homes for the bacteria. The food medium is emptied from the tanks and is then mixed with this soil medium in proper proportion and the culture stored in ordinary tubs or boxes and shipped in ordinary tin cans.

While every conceivable precaution must be exercised to guard against contamination of the culture during the breeding process, when the germs are few and weak, no further safeguards are required after completion of the breeding period, as the germs are then in a healthy and virile state and more than able to defend themselves against foreign organisms.

It will be self-evident that the aeration of the food material may be accomplished by exhausting the air above the liquid 30 through the valve 24 by connecting pipe 25 with a vacuum pump, though I preferably employ the pressure system illustrated as promoting propagation of the bacteria, as above stated. When this is done, the system of piping illustrated in Figure 4 may be opened between tank C and filter E; or it may be opened between filter E and the individual filters 21, in which case the individual filters will be relied upon for purification of the incoming free air.

I claim:

1. The method of breeding bacteria, which comprises inoculating a liquid food material with aerobic nitrogen-fixing bacteria of the genus Rhizobium, and aerating the liquid material by injecting air thereinto in proper direction to cause rotation of the mass of material whereby aeration of the entire mass is assured, propagation of the bacteria occurring in the aerated liquid material.

2. The method of breeding bacteria, which comprises inoculating a liquid food material with aerobic nitrogen-fixing bacteria of the genus Rhizobium, and aerating the mass of liquid material and causing rotation thereof solely by injecting air into the mass in proper direction to impart rotation thereto whereby aeration of the entire mass is assured, propagation of the bacteria occurring in the aerated liquid material.

3. The method of breeding bacteria, which comprises inoculating a liquid food material with aerobic nitrogen-fixing bacteria of the genus Rhizobium, aerating the mass of liquid material in a container and causing rotation of the mass solely by injecting air into the mass in proper direction to impart rotation thereto whereby aeration of the entire mass is assured, propagation of the bacteria occurring in the aerated liquid material, and regulating the escape of air from above the mass and maintaining the mass of material under a pressure above atmospheric and favorable to propagation of the bacteria during propagation thereof.

4. The method of breeding bacteria, which comprises inoculating a liquid food material with aerobic nitrogen-fixing bacteria of the genus Rhizobium, aerating the mass of liquid material in a container and causing rotation of the mass solely by injecting air into the mass in proper direction to impart rotation thereto whereby aeration of the entire mass is assured, propagation of the bacteria occurring in the aerated liquid material, and maintaining the mass of material under pressure differing from atmospheric pressure and favorable to propagation of the bacteria during propagation thereof.

5. The method of breeding bacteria, which comprises inoculating with aerobic nitrogen-fixing bacteria of the genus Rhizobium a liquid food material containing nitrogen in proper amount to stimulate growth of the bacteria but insufficient to hinder maximum development thereof, and aerating and rotating the mass by injecting air thereinto, propagation of the bacteria occurring in the aerated liquid mass.

6. The method of breeding bacteria, which comprises inoculating with aerobic nitrogen-fixing bacteria of the genus Rhizobium a slightly acid liquid food material of proper acidity to promote growth of the bacteria, and aerating and rotating the mass by injecting air thereinto, propagation of the bacteria occurring in the aerated liquid mass.

7. The method of breeding bacteria, which comprises inoculating with aerobic nitrogen-fixing bacteria of the genus Rhizobium a slightly acid liquid food material of proper acidity and containing nitrogen in proper amount to promote and stimulate growth of the bacteria and aerating the mass by injecting air thereinto, propagation of the bacteria occurring in the aerated liquid mass.

In witness whereof, I hereunto subscribe my name this 6th day of January, 1927.

FRANK J. MATCHETTE.